United States Patent
Lindsay et al.

(10) Patent No.: US 9,619,046 B2
(45) Date of Patent: Apr. 11, 2017

(54) DETERMINING PHRASE OBJECTS BASED ON RECEIVED USER INPUT CONTEXT INFORMATION

(71) Applicant: Facebook, Inc., Menlo Park, CA (US)

(72) Inventors: Robert Taaffe Lindsay, San Francisco, CA (US); Giridhar Rajaram, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/779,485

(22) Filed: Feb. 27, 2013

(65) Prior Publication Data

US 2014/0244622 A1     Aug. 28, 2014

(51) Int. Cl.
G06F 17/30     (2006.01)
G06F 7/00      (2006.01)
G06F 3/023     (2006.01)
G06F 17/27     (2006.01)

(52) U.S. Cl.
CPC .......... *G06F 3/0237* (2013.01); *G06F 17/276* (2013.01)

(58) Field of Classification Search
None
See application file for complete search history.

(56) References Cited

U.S. PATENT DOCUMENTS

| | | | |
|---|---|---|---|
| 7,287,025 B2* | 10/2007 | Wen et al. | |
| 8,190,627 B2* | 5/2012 | Platt et al. | 707/767 |
| 8,838,438 B2* | 9/2014 | Leary et al. | 704/9 |
| 8,903,719 B1* | 12/2014 | Landry | G06F 17/21 704/10 |
| 2011/0264656 A1* | 10/2011 | Dumais et al. | 707/728 |
| 2012/0166532 A1 | 6/2012 | Juan et al. | |
| 2012/0232998 A1 | 9/2012 | Schoen | |
| 2013/0036169 A1* | 2/2013 | Quigley et al. | 709/204 |
| 2013/0103696 A1* | 4/2013 | Wu et al. | 707/748 |
| 2013/0211821 A1* | 8/2013 | Tseng | G06F 17/273 704/9 |
| 2013/0212059 A1* | 8/2013 | Ameri-Yahia | G06F 17/30713 706/52 |
| 2014/0041038 A1* | 2/2014 | Lessin | G06Q 50/01 726/26 |

\* cited by examiner

*Primary Examiner* — Sangwoo Ahn
(74) *Attorney, Agent, or Firm* — Fenwick & West LLP (57) ABSTRACT

A composer interface allows a user to provide input, such as text data, to the social networking system. To reduce the number of inputs for a user to provide to the social networking system, one or more phrase objects are presented to the user when providing input. A phrase object includes a group of objects that users have previously provided to the social networking system. The social networking system presents phrase objects to the user that match at least a portion of the received input. Context information associated with the input and associated with various phrase objects may be used to select the presented phrase objects. By selecting a presented phrase object, the user includes the selected phrase object in the input.

20 Claims, 5 Drawing Sheets

DETERMINING PHRASE OBJECTS BASED ON RECEIVED USER INPUT CONTEXT INFORMATION

BACKGROUND

This invention relates generally to social networking systems and in particular to determining phrase objects to present to a user on a social networking system.

Social networking systems allow their users to efficiently communicate information with each other to encourage interactions between users. Social networking systems allow users to share content with each other, to organize events for users to meet in person, to establish connections with other users, or to perform other interactions with each other. To encourage user interactions, social networking systems strive to streamline interactions between the user and the social networking system. For example, a social networking system provides its users with interfaces that seek to reduce the number of clicks to reach a page, to reduce the number of characters a user inputs to provide content to the social networking system, and to reduce clutter when presenting content to users. Simplifying user interactions with the social networking system increases the likelihood that users continue using a social networking system.

However, users increasingly access social networking systems, and other systems, through mobile devices. Many mobile devices are configured to receive user input through methods different from traditional user input methods, such as keyboards and mice. This use of different input methods limits the effectiveness of conventional techniques for simplifying user interaction with a social networking system. For example, conventional social networking systems are unable to effectively reduce the number of inputs (e.g., number of button presses or strokes) necessary for users to enter words or phrases for communication to the social networking system. Conventionally-used predictive text capabilities do not account for user-specific information, so they often do not suggest relevant words until after a user has entered a number of characters.

SUMMARY

A social networking system provides a user with a composer interface for receiving content from the user, such as posts of content for presenting to other social networking system users. To simplify entry of content, the social networking system analyzes input received via the composer interface and presents the user with candidate phrase objects based on the input. A phrase object is a combination of objects maintained by the social networking system. For example, a phrase object includes a combination of words, phrases, links, pictures, videos, events, friends, connections, time and the like. For example, the word "bunny" may be coupled with an image of a small rabbit to form a phrase object. In another example, a phrase object is the word "bunny" and a user's profile maintained by the social networking system. Hence, phrase objects may include an object maintained by the social networking system and text associated with the object. An object may comprise textual data (e.g., words, links), visual data (e.g., images, video, icons), audio data (e.g., sound files, audio messages), or other suitable type of data. Additionally, an object may be any entity (e.g., individuals, websites, pages, companies, groups and the like) that is defined by the social networking system. In an embodiment, a phrase object may be two or more words that are used together by social networking system users. The words in a phrase object may have different parts of speech and be combined based on their use by social networking system users.

In one embodiment, phrase objects are selected and extracted from posts previously received by social networking system users. A "post" is content received by the social networking system for presentation to social networking system users. The social networking system analyzes received posts and identifies candidate objects for a phrase object based on the posts. Candidate objects may include words, links, names, photos, or other data used in a threshold number of posts or in a threshold percentage of posts. After identifying a candidate object, the social networking system identifies objects in posts including the candidate object within a threshold distance of the candidate object. For example, the social networking system analyzes objects within a threshold number of words or objects from a candidate object in the posts. Any suitable method (such as text rules, grammatical rules, text patterns, common usages and so forth) may be used to identify objects included along with a candidate object in a phrase object. The social networking system may also determine context associated with a post from which a phrase object is identified and associate the context with extracted phrase object as metadata. Examples of context include descriptive or social information of the user associated with the post, geographic information associated with the post, temporal data associated with the post, or other suitable information. Statistical information, such as the rate with which a phrase object is used, the popularity of the phrase object, or other suitable information may also be associated with an extracted phrase object.

To reduce the number of characters a user has to input, the social networking system may provide phrase objects as suggestions while the user is providing input to the social networking system. For example, a user begins typing "bu" in an interface provided by the social networking system and phrase objects matching at least a portion of the received input, such as "bunny," "bunny store," "bunny feed," "cute bunny," are displayed. The user may select a presented phrase object rather than continue entering text data. Phrase objects presented to the user may be selected based on the context of the post, the received content for the post, as well as statistical values associated with phrase objects. In one embodiment, the location associated with the user-provided post content is used to select displayed phrase objects. For example, if "bu" is received while the user is composing a post in a pet store, "bunny," "bunny store," "bunny feed," and "cute bunny" are displayed; however, if the user provides "bu" while in a chemistry laboratory, different phrase objects, such as "burning," "Bunsen burner," "butane," and "chemical burn" are displayed. Displayed phrase objects may be ordered based on statistical values associated with each phrase object and presented to a user according to the ordering. Hence, phrase objects that are commonly used on the social networking system, popular phrase objects, or phrase objects with high rates of use may be presented to the user before lesser-used phrase objects.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other social networking system users. Users join the social networking system and add connections to other users to which they desire to be connected. Social networking system users may provide information describing themselves, such as their age, gender, geographical location, education history, employment history, and the like. This user-provided information acts as personal context information that may be used by the social networking system to recommend groups, events, other users, actions, or other content to the user.

In addition to declarative information provided by users, the social networking system may also record users' actions performed internal to the social networking system and/or performed on external systems that communicate with the social networking system. Examples of external systems include third party sites, plugins, desktops, terminals, kiosks or other similar systems. The recorded actions are historical or social context information for the user. Examples of user actions include communications with other users, sharing content such as photos, interactions with content and advertisements, responding to a poll, attending an event, joining a group, modifying declarative information, or any other suitable action. Examples of data describing recorded actions performed external to the social networking system include websites visited by the user, content with which the user interacted, and other suitable data. The social networking system may also use other information recorded by the user device or terminal/kiosk, such as surrounding environment (e.g., location, temperature, humidity, ambient noise), biometric data (e.g., heart rate, temperature, mood, activity, voice recognition), motion (e.g., accelerometer data, movement speed, shaking), detection of other users/devices and so forth, as part of recorded context information.

By analyzing stored information associated with a user, a social networking system may improve the services offered to users. For example, information associated with a user allows a social networking system to provide the user with content more likely to be of interest to the user. In various embodiments, the social networking system stores information associated with a user in one or more databases to simplify its retrieval.

Traditionally, users have been largely restricted to stationary computing devices, limiting the social networking system to obtaining information from users during the time when as user is using a stationary computing device. However, users are increasingly accessing social networking systems through mobile computing devices, such as smartphones and tablets. This allows a social networking system to receive a more continuous stream of information from its users. For example, users may "check-in" or indicate their current location via a mobile device, identify other users proximate to the user, comment on actions, view content relevant to a store or establishment where the user is located. Additional sensors and functionalities of mobile computing devices, such as global positioning systems (GPS), cameras, video cameras, voice recorders, and other systems further increases the information available to be sent to the social networking system.

Furthermore, the portability of mobile devices allows users to connect to and interact with a social networking system from a greater variety of locations than when using a stationary computing device. For example, users may compose posts or provide other content to a social networking system while away from home or work using a mobile computing device. As another example, users may provide comments while attending an event, such as a seminar or a concert. Interacting with the social networking system via a mobile computing device allows users to submit information in near real-time, which the social networking system may use to modify a dynamic profile of the user for providing more personalized interactions with the social networking system for various users.

However, using a mobile computing device to compose posts or other content for communicating to the social networking system is relatively cumbersome for users. For example, to generate a post using conventional techniques, a user often needs to input a significant number of strokes or button presses to enter the post content. This cumbersome input of multiple characters using small input devices of a mobile computing device may discourage users from social networking system use in part due to the inconvenience of typing a significant number of characters. Some online systems use predictive texting or word suggestions to allow users to provide content while entering a smaller number of characters. However, many conventional predictive word suggestions are based on individual words and not phrases. For example, conventional predictive word suggestions often generate a list of individual words matching a portion of the input received from a user. However, the lists generated by conventional systems typically do not include phrases. Furthermore, suggestions provided by conventional systems may often include words with characters in a specific location matching the received input while excluding words with characters in other locations matching the received input. For example, when receiving the input "cre" conventional systems may present "cream" while not presenting "ice cream" or "chocolate ice cream." To provide a user with more relevant suggestions for input, phrase objects comprising objects maintained by the social networking system and including content that matches at least a portion of the received input are identified. For example, a phrase object may include content preceding the received input corresponding to an object not previously identified by the received input but that may the user's intended input. In some embodiments, phrase object suggestions can be extended to systems outside of the social networking system. For example, the phrase object suggestion modules can be incorporated into iframes, Connect, plugins, programs, or desktop widgets that can recognize when a user is creating a post outside of the social networking system and provide similar phrase object suggestions in the outside system.

A social networking system may identify phrase objects for suggestion by identifying and extracting objects from previously received content, such as posts. Words or objects within a specified distance or proximity of an extracted object may also be identified and grouped with the extracted object to create a phrase object. Analyzing the post or other content from which the phrase object was identified, the social networking system may associate context with the phrase object. The extracted phrase object and the context allows the social networking system to categorize the phrase object under a single "hub" or overarching category for the phrase object. For example, "a great dinner" may be categorized under the "dinner" hub. In an embodiment, the social networking system uses the hub and connected phrase objects in combination with extracted context and statistics associated with the phrase object to generate personalized phrase object suggestions for each user.

Stored data may be used to identify patterns in a user's behavior, such as including certain words in posts while in specific situations or places, commenting while attending certain events, and so forth. Additionally, various posts may be analyzed to identify frequencies with which words or other objects are received from users. Stored data may also be used to correlate geographical location tags (e.g., current location indicators or location indicators for past posts) with objects for possible inclusion in posts. For example, if the user was at a restaurant, phrase objects associated with restaurants, such as "eating food," "drinking tea," or "waiting in line" may be presented. Furthermore, phrase objects may be presented to a user so that phrase objects more likely to be selected by the user are prioritized. Phrase objects presented to a user may also be filtered so that phrase objects having less than a threshold likelihood of selection by the user are not presented.

Using stored data describing a user's behavior along with received information describing a user's environment when providing content to the social networking system (the combination referred to as "context data") phrase objects more likely to be selected by the user may be presented. For example, when a user accesses an interface to provide content to the social networking system (a "composer interface"), the social networking system begins identifying candidate phrase objects for the user based in part on the context information and statistical data. As described above, phrase objects may be presented to the user based in part on the previously extracted statistical data. For example, phrase objects having the highest frequencies of use by the user or by social networking system users are prioritized for display.

A social networking system may further improve suggestions by using machine learning and modeling to determine patterns in the content provided to the social networking system by a user. As the user submits content (e.g., posts, comments, etc.) to the social networking system, a database of content provided by the user is generated and may be used to develop basic models on user phrase object choice. These models may be used to identify phrase objects likely to be selected by the user without receiving a significant amount of user inputs. In some embodiments, the social networking system may also generate an automatic post using determined phrase object suggestions without having the user type the post, based on knowing the user's current context and having a reasonable level of confidence in accuracy.

System Architecture

Figure 1:
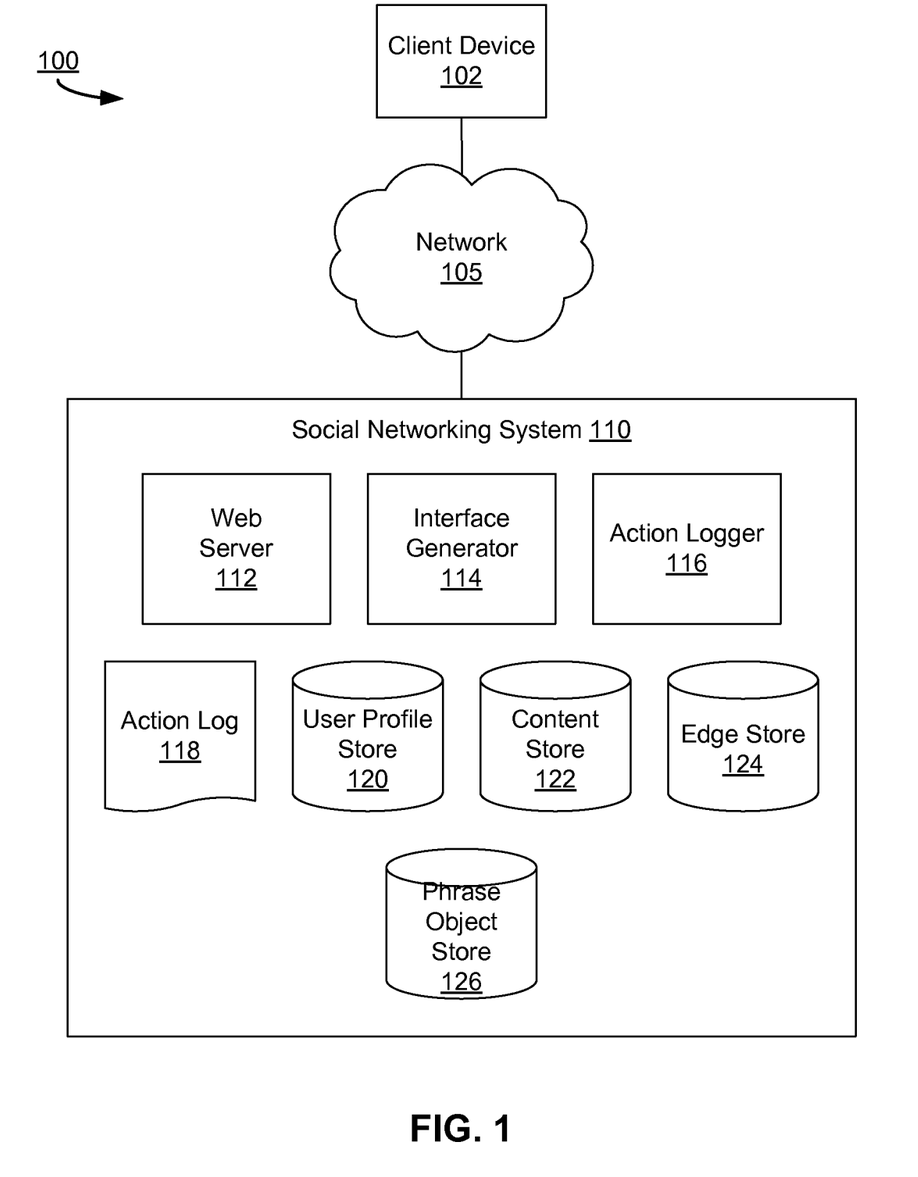
FIG. 1 is a block diagram of a system environment including a social networking system, in accordance with an embodiment.

FIG. 1 is a block diagram of a system environment including a social networking system. The example shown in FIG. 1 includes a client device 102, a network 105, and a social networking system 110. Other embodiments may include different and/or additional components than those shown by FIG. 1.

Client device 102 is a computing device capable of processing data as well as transmitting and receiving data via network 105. For example, client device 102 may be a desktop computer, a laptop computer, a smart phone, a tablet computing device, or any other device having computing and data communication capabilities. Client device 102 is coupled to network 105, which may comprise any combination of local area, cellular, wireless, and/or terrestrial communication systems.

Users of social networking system 110 may provide data to social networking system 110 using client device 102 and network 105. In use, users join social networking system 110 and add connections to other social networking system users. These connections may reflect connections existing outside of the social networking system 110, or "offline" relationships between users. Social networking system 110 may provide a user with stories describing actions or content associated with other social networking system users connected to the user.

Users of social networking system 110 may explicitly add or remove connections between themselves and other users and/or objects. In addition, some connections may be automatically created based on common characteristics between users or between users and objects. For example, social networking system 110 may create connections between users from the same educational institution or associated with the same organization. Connections maintained by social networking system 110 are often, but not necessarily, mutual; hence, some connections may be unilateral. For example, user A and user B are both users of social networking system 110 and connected to each other; thus, user A and user B have a bilateral connection where each may view information shared by the other user. However, user A may establish a connection with user C, while user C does not establish a connection to user A. Accordingly, a unilateral connection is formed between user A and user C where limited information may be shared between user A and user C. Although connections between users are often direct, some connections may be indirect, where indirectly connected users are separated by connections to one or more intermediate users (also referred to as "degrees of separation").

Social networking system 110 allows users to post and share stories describing themselves or their activities. A story may be presented to other users connected to a user posting or sharing the story, enhancing user interactions with social networking system 110. Stories may include any data a user may add, upload, send, transmit, or "post," to social networking system 110. For example, a user uploads a post to social networking system 110 from client device 102. The post may include textual data (e.g., comments, status updates, notes, or links), geographic location information, photos, videos, links, music, or other data.

To compose a post on social networking system 110, users select characters by selecting or inputting characters through an input device of client device 102. Examples of methods for providing input via client device 102 include selecting characters from a displayed character array, typing on an external keyboard, drawing characters on a touchscreen display, selecting from a list of suggestions, or any other suitable technique. Input provided to client device 102 is communicated to social networking system 110 via network 105, and social networking system 110 analyzes the received input to identify phrase objects based on the input.

Social networking system 110 comprises one or more computing devices that store information on a plurality of users, objects and connections between users and/or objects as well as allow users to interact with each other. In the embodiment illustrated in FIG. 1, social networking system 110 includes web server 112, interface generator 114, action logger 116, action log 118, user profile store 120, content store 122, and edge store 124, and phrase object store 126. Other embodiments of social networking system 110 may have different and/or additional components or may include fewer components than those shown in FIG. 1.

Web server 112 links social networking system 110 to client device 102 via network 105, and may link social networking system to one or more third-party systems via network 105. Web server 112 serves web pages, as well as other content, such as JAVA®, FLASH®, XML and so forth. Web server 112 may receive and route messages between social networking system 110 and client device 102, for example, instant messages, queued messages (e.g., email), text and short message service (SMS) messages, or messages sent using any other suitable messaging technique. A user may send a request to web server 112 to upload information, for example, images or videos that are stored in content store 122, further described below. Additionally, web server 112 may provide application programming interface (API) functionality to send data directly to native client device operating systems, such as IOS®, ANDROID™, WEBOS® or RIM®.

Interface generator 114 processes data from other components of social networking system 110 and generates an interface that is communicated to a client device 102. Social networking system users view information from social networking system 110 and provide information to social networking system 110 via one or more interfaces generated by interface generator 114. For example, information describing content presented by an interface and accessed by a user is communicated to social networking system 110, allowing social networking system 110 to maintain a record of content with which the user interacted. In one embodiment, interface generated 114 determines the interactions between the client device 102 and users via the interface and processes the interactions into formats used by other components of social networking system 110.

In one embodiment, interface generator 114 generates a composer interface for receiving data describing content from a user for distribution to social networking system users. When a user provides text content for communicating to social networking system 110, such as content for writing posts, making comments, entering search parameters, completing data forms and the like, interface generator 114 presents the user with a composer interface for entering text and/or other input. For example, a user may access the composer interface by interacting with another interface presented by social networking system 110, causing interface generator 114 to present the composer interface. In one embodiment, the composer interface is a text entry region, such as a text box, and other composition-related icons and functions. Input received via the composer interface is communicated to social networking system 110, which stores the received input and retrieves context information associated with the user providing the input from one or more of action log 118, user profile store 120, content store 122, and edge store 124.

Based on the received input and context information, interface generator 114 identifies one or more suggested phrase objects for presentation to the user as suggestions. In one embodiment, context data is used to augment the interface generator's 114 suggestions by allowing social networking system 110 to identify patterns from content previously received from the user while the user provides input via the composer interface. For example, the user may begin typing "choc" into a textbox and interface generator 114 identifies and presents the phrase object "eating chocolate cake" and other phrase objects based on context information and phrase objects' popularities.

In an embodiment, interface generator 114 determines probabilities of the user selecting an identified phrase object when providing input. These probabilities may be used to determine one or more phrase objects presented to the user via the composer interface. For example, phrase objects having less than a threshold probability of use are not displayed via the composer interface. The composer interface may display the phrase objects in an order based on their probabilities or may visually distinguish phrase objects having at least a threshold probability from other phrase objects presented to the user.

Action logger 116 receives information about user actions on social networking system 110, as well as actions performed outside of social networking system 110, and records this information in action log 118. Examples of actions include: adding a connection to another user, sending a message to another user, uploading an image, reading a message from another user, viewing content associated with another user, attending an event posted by another user, and any other suitable action. In addition, a number of actions described in connection with other objects are directed at particular users, so these actions are associated with those users as well when stored in action log 118. Action logger may also receive system information from the device that the user actions took place on, such as from terminals, kiosks, mobile devices, computers and the like.

Action log 118 may be used by social networking system 110 to track user actions on social networking system 110, as well as on external systems that communicate information to social networking system 110. Users may interact with various objects on social networking system 110, including commenting on posts, sharing links, and checking-in to physical locations via a mobile device, accessing content items or other interactions. Information describing these actions is stored in action log 118. Additional examples of interactions described by data in action log 118 include commenting on a photo album, transmitting communication between users, joining an event, joining a group, becoming a fan of a brand page, creating an event, authorizing an application, using an application and engaging in a transaction. Additionally, action log 118 records a user's interactions with advertisements on social networking system 110 as well as other applications operating on social networking system 110. In some embodiments, data from action log 118 is used to infer interests or preferences of the user, augmenting the interests included in a user's user profile and allowing a more complete understanding of user preferences.

Action log 118 may also store user actions taken on external systems. For example, an e-commerce website that primarily sells sporting equipment at bargain prices may recognize a user of social networking system 110 through a social plug-in enabling the e-commerce website to identify the social networking system user. Because users of social networking system 110 are uniquely identifiable, third-party systems, such as this sporting equipment retailer, may use the information about these users as they visit their websites. Action log 118 records data about these users, including webpage viewing histories, advertisements that were engaged, purchases made, and other patterns from shopping and buying.

Social networking system 110 maintains a user profile for each of its users and stores these user profiles in user profile store 120. A user profile includes information about the user that the user has provided to social networking system 110, such as biographic, demographic, work experience, educational history, gender, hobbies or preferences, location and the like. However, user profiles may also include information inferred by social networking system 110, such as possible interests or connections to additional users. User profiles may also include information that are detected by a device and transmitted to the social networking system 110, such as biometric data or activity data. In one embodiment, a user profile includes a plurality of data fields, each describing one or more attributes about a corresponding social networking system user. A user profile may also store other information provided by the user, such as images, videos, comments, and other stories in which the user has been identified or "tagged." A user profile stored in user profile store 120 may also include links to content stored in content store 122, edge store 124, and/or action log 118 that is related to the user.

Content store 122 stores objects representing various types of content. Examples of content represented by an object include a page post, a status update, a photo, a video, a link, a shared content item, a gaming application achievement, a check-in event at a local business, a brand page, or any other type of content. Objects may be created by users of social networking system 110, such as status updates, photos tagged by users to be associated with other objects in the social networking system, events, groups or applications. In some embodiments, objects are received from third-party applications, which may be external to social networking system 110. Content "items" represent single pieces of content that are represented as objects in social networking system 110. Users of social networking system 110 are encouraged to communicate with each other by posting text and content items of various types of media through various communication channels, increasing the interaction of users with each other and increasing the frequency with which users interact with social networking system 110. Stories associated with users are also included in content store 122. As used herein "stories" include any type of comments, notes, status updates, links, videos, pictures and the like. Objects are retrieved from content store 112 to present content to users via an interface or other suitable communication channel.

Edge store 124 stores information describing connections between users and other objects on social networking system 110 as edges. Some connections may be defined by users, allowing users to specify their relationships with other users. For example, users may generate edges with other users that parallel the users' real-life relationships, such as friends, co-workers, partners, and so forth. Other connections are generated when users interact with objects in social networking system 110, such as expressing interest in a page on the social networking system 110, sharing a link with other users of the social networking system 110, and commenting on posts made by other users of the social networking system 110. Edge store 124 may also record the changes in user connections over time. For example, when user A establishes a connection with user B, edge store 124 includes data identifying the type of connection, the time the connection was established, and may store other information associated with the connection, such as an application or process used to create the connection. In some embodiments, connections between users may be stored in user profile store 120, content store 122 or either of those stores may access edge store 124 to determine connections between users and other users or objects.

Information describing edges is also stored in edge store 124, such as affinity scores for objects, interests, and other users. Affinity scores may be computed by social networking system 110 over time to approximate a user's affinity for an object, interest, and other users in social networking system 110 based on the actions performed by the user. A user's affinity may be computed by social networking system 110 over time to approximate a user's likely interest in an object, interest, and other users of social networking system 110 based on the actions performed by the user. Computation of affinity is further described in U.S. patent application Ser. No. 12/978,265, filed on Dec. 23, 2010, which is hereby incorporated by reference in its entirety. In various embodiments, multiple interactions between a user and a specific object may be stored in a single edge in edge store 124 or may be stored as multiple edges in edge store 124.

Phrase object store 126 includes phrase objects for inclusion by social networking system users in content, such as posts, distributed by social networking system 110. The phrase objects may be acquired based from phrase objects previously provided to social networking system 110 from one or more social networking system users or based on information from another source (e.g., a dictionary or external word bank). In some embodiments, phrase object store 126 includes phrases that may be considered as "slang" to account for contemporary changes in language or "online speech." Phrase object store 126 may include words from various languages to allow identification of a wider range of phrase objects. In some embodiments, phrase object store 126 is updated at time intervals to add or remove phrase objects. In an embodiment, phrase object store 126 may also be optimized for retrieval of stored phrase objects by limiting storage to phrases likely to be used in a social networking system 110.

Suggesting Phrase Objects

Figure 2:
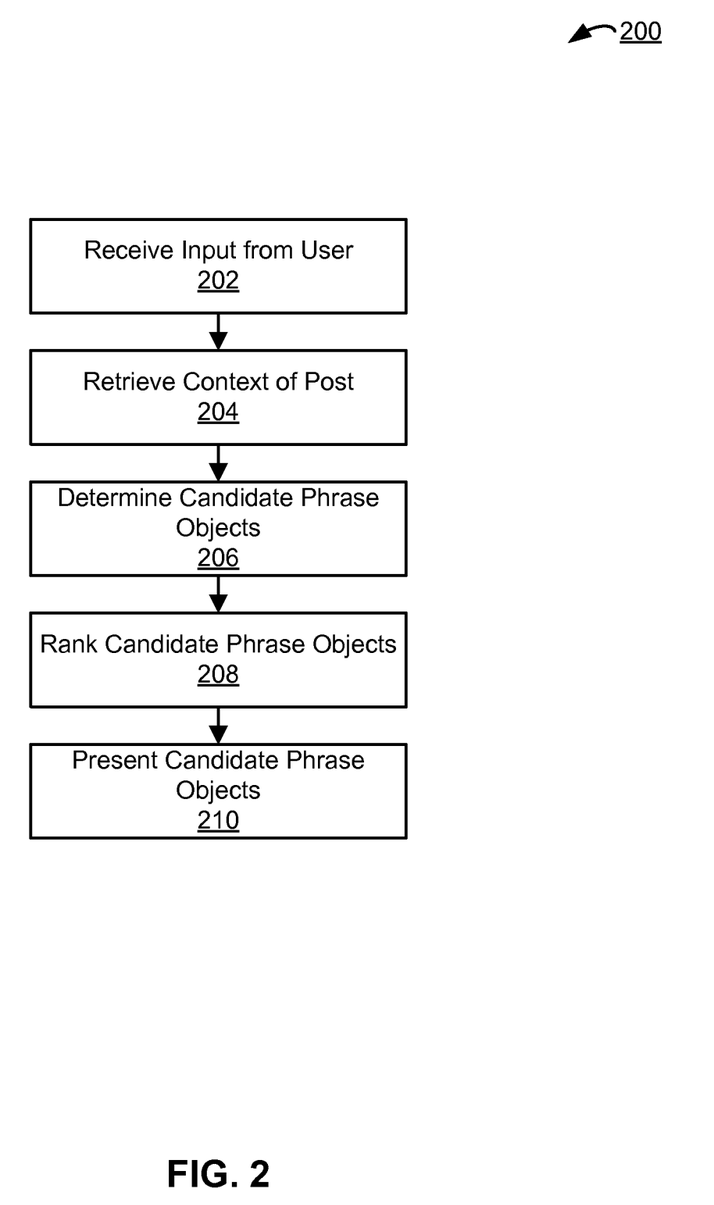
FIG. 2 is a flow chart of a method for selecting phrase objects for presentation to a user based on received input, in accordance with an embodiment.

FIG. 2 is a flow chart of an embodiment of a method 200 for selecting phrase objects for presentation to a user based on received input. As a user provides content for a post to social networking system 110, one or more phrase objects are selected by social networking system 110 for inclusion in the post based on the provided content. For example, as text is received via a composer interface, social networking system 110 identifies candidate phrase objects matching at least a portion of the received text. In one embodiment, the frequency with which phrase objects are selected by social networking system users is used when selecting phrase objects presented to the user providing content to reduce the number of inputs for a user to provide to complete a post.

As social networking system 110 receives 202 input from a user for inclusion in a post, social networking system 110 retrieves 204 context information from one or more of action log 118, user profile store 120, and edge store 124. For example, when social networking system 110 receives 202 input via a composer interface, interface generator 114 retrieves 204 context information, such as personal, social, historical, geographical, temporal, biometric, device-related and similar other information associated with the user providing the input. For example stored context information associated with the user describes actions previously performed by the user and one or more characteristics associated with the user. Context information associated with the user may include content previously provided by the user, the user's location, the time when the user provides the input, input previously provided by the user from the same or a similar location, input received from other users at the same or a similar location. Other context associated with the user may include users with the user when the input is received.

Interface generator 114 determines 206 one or more candidate phrase objects based on the received input and the retrieved context associated with the received input and/or the user. For example, interface generator identifies objects included in or associated with content previously received from the user or included in or associated with other social networking system users. In one embodiment, words included in previously received content are identified. Additionally, other types of objects such as pictures, videos, links, friends, events, or groups may be identified from previously received content. When an object is identified, additional objects within a threshold distance of the identified object may also be identified and grouped together to form a phrase object. For example, the interface generator 114 identifies the word "friend" as an object and also identifies words within 5 words of "friend" in at least a threshold amount of content and groups the words into phrase objects such as "calling my friend," "meeting up with a friend," "friends and family" and so forth. Phrase objects may be pre-computed offline or be composed on-the-fly, such as for previously unknown phrase objects. Phrase objects are extracted based on parts of speech taggers and topic taggers, which matches a phrase object with other related phrase objects. In some embodiments, the extraction of phrase objects may depend on many occurrences of the same phrase objects with similar sets of related phrase objects in order to filter out noise or periphery phrase objects. Identified phrase objects are associated with the context of the posts, or other content, from which they are extracted. For instance, the phrase object "drinking beer" is extracted from a post received from a user while at a bar during the evening, so interface generator 114 associates the phrase object with the time and location. Interface generator 114 may determine the number of times various phrase objects have appeared in previously received content (e.g., posts) received from the user and/or in previously received content received from other social networking system users. The frequency with which phrase objects appear in content may be used to determine 206 candidate phrase objects.

In one embodiment, interface generator 114 filters phrase objects by comparing the context associated with stored phrase objects to context associated with the received input. For example, interface generator 114 discards phrase objects having less than a threshold percentage of attributes of context matching, or similar to, context associated with the received input. Alternatively, interface generator 114 identifies phrase objects having at least a threshold percentage or number of attributes of context matching, or similar to, context associated with the received input. Identifying candidate phrase objects based on similarity of contexts may increase the likelihood of identifying candidate phrase objects relevant to the received input From the identified phrase objects, one or more candidate phrase objects are determined 206. For example, interface generator 114 determines candidate phrase objects matching at least a portion of the received input and associated with context having a threshold similarity to the context of the received input. Additionally, the frequency with which identified phrase objects are selected or provided by the user or by other users of social networking system 110 may be used when determining 206 candidate phrase objects 206. Any combination of the above-identified factors may be used to determine 206 candidate phrase objects.

The candidate phrase objects are ranked 208 based on the likelihood of being selected by the user. In various embodiments, the ranking may be based on several factors, including the degree of relevance to the received input, the frequency with which the user uses a candidate phrase object, a candidate phrase object's popularity with social networking system users, or any other suitable factor. As another example, interface generator 114 identifies a location from the retrieved context and associates a higher probability with phrase objects associated with the identified location. For example, if a user is providing input from a movie theater, data items relating to movie theaters (e.g., movies, tickets, seats, popcorn, drinks, line, wait, previews, snacks, etc.) are assigned higher probability values than unrelated to theaters (e.g., beach, ski, winter, flying, weather, paperwork, bunny, etc.). Candidate phrase objects with higher likelihoods of selection by the user may have a higher position in the ranking. Based on the ranking, one or more phrase objects from the candidate phrase objects are selected and presented 210 to the user. In one embodiment, candidate phrase objects having at least a threshold likelihood of selection or having the highest likelihoods of selections are visually distinguished when presented. Alternatively, the presented candidate phrase objects may be limited to candidate phrase objects having at least a threshold likelihood of selection to more efficiently present information to the user. In various embodiments, threshold value may be pre-determined (e.g., pre-set by social networking system operators) or dynamic (e.g., select only the top five phrase object selections). The user may select a presented phrase object to complete the received input, simplifying communication of content to social networking system 110.

In some embodiments, additional data may be associated with phrase objects and presented 210 along with the phrase objects. For example, phrase objects may be associated with related images, links, events, sound clips, videos, or other data. The data associated with the phrase objects are presented 210 along with the phrase objects. For example, "bathing in hot water" and "pouring hot water" may be phrase object suggestions displayed to a user in response to the user typing "water." In the embodiments where images are associated with the phrase object, small icons may be displayed next to each phrase object, such as an image of a bath tub for "bathing in hot water" and an image of a teapot for "pouring hot water." The images may be retrieved from a set of generic images or retrieved from images associated with the user.

Example User Interface for Suggesting Phrase Objects

Figure 3:
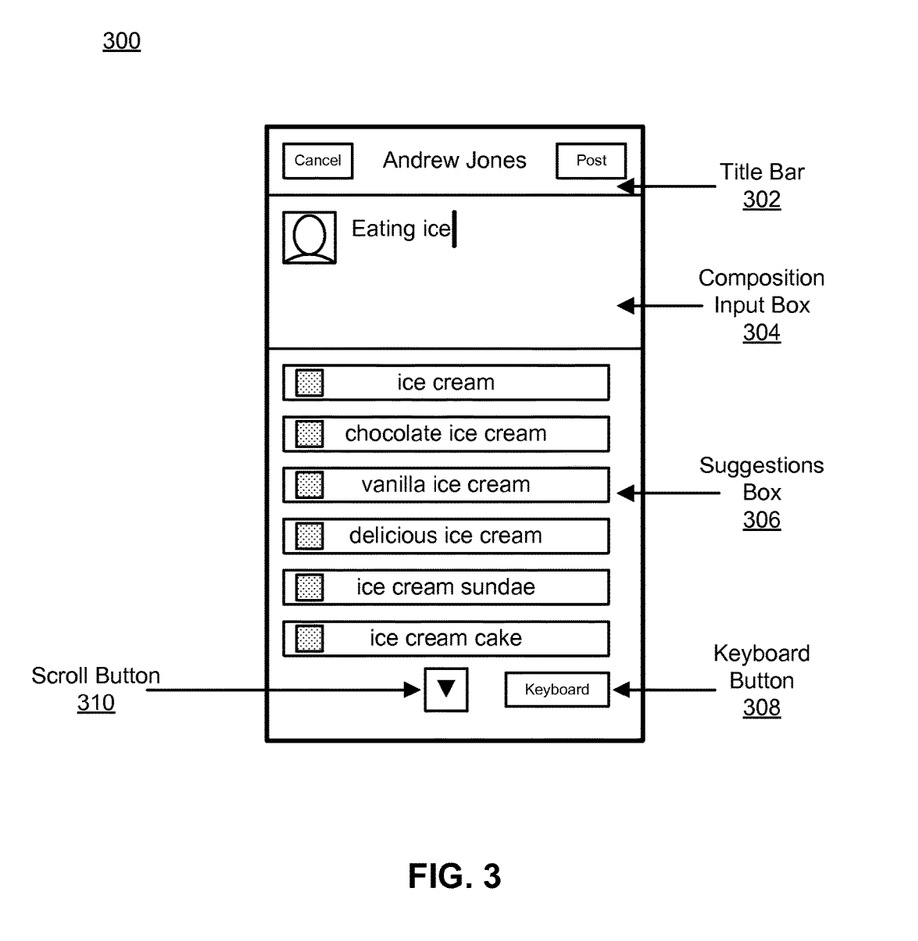
FIG. 3 is an illustration of a composer interface for displaying phrase objects to a user, in accordance with an embodiment.

FIG. 3 is an illustration of an example composer interface 300 for presenting phrase objects to a user based on received input. In various embodiments, composer interface 300 may be displayed in various formats on different display devices, such as computer monitors, projectors, tablet displays, cell phone displays and the like. Users may also interact with composer interface 300 display through various input methods, such as a keyboard, mouse, touch-sensitive surfaces, audio commands and so forth. In the example of FIG. 3, composer interface 300 includes title bar 302, composition input box 304, suggestions box 306, keyboard button 308, and scroll button 310. Other embodiments may include different components or have different arrangements or orientations.

Composer interface 300 is presented to a social networking system user to receive input identifying content for presentation via social networking system 110, such as a post. In one embodiment, a virtual keyboard may be displayed instead of suggestions box 306, allowing the user to provide input to composition input box 304 by interacting with the virtual keyboard. As composition input box 304 receives input from the user, suggestions box 306 presents one or more phrase objects based on the received input. In some embodiments, composition input box 304 may display phrase object suggestions based on high confidence in the suggestions based on detected context information and/or previous actions without having received input from the user. The user may select a phrase object from the suggestions box 306 to complete the input or may continue manually providing input, which modifies the phrase objects presented in suggestions box 306. A phrase object selected from suggestions box 306 is presented in composition input box 304.

In an embodiment, title bar 302 provides basic information and options for a composer interface 300. In the example of FIG. 3, title bar 302 includes the name of the user and options to post or cancel the current text entry. Other embodiments may include different information, such as the name of social networking system 110, the name of the recipient (if the post is on another user's page), the time, the location, the type of post and so forth. Title bar 302 may also include different features for interacting with composer interface 300, such as text field options, font and size changes, attachment options, program manipulation options and so forth. Title bar 302 may be located in different portions of the display in various embodiments.

Composition input box 304, or the text field, displays text corresponding to input received from the user or corresponding to phrase objects selected by the user. Before receiving input from a user, composition input box 304 may include a blank screen, a blinking line indicating a text entry location, a faded prompt (e.g., "What's on your mind?" or "Enter text here"), or any other suitable content. As input, such as characters, is received, composition input box 304 is updated to display the received input. Other modifications to the content of the composition input box 304 (such as shifting the blinking line to follow the text entry) may be performed as input is received. In some embodiments, composition input box 304 includes data in addition to input received form a user. For example, FIG. 3 shows composition input box 304 including a small image of the user providing input. Other embodiments may include a brief summary of the user (e.g., name and age), reminders (e.g., current time or location), option buttons (e.g., icons for adding attachments to the post, icons for attaching metadata to the post, editing options and the like), or other suitable information.

In some embodiments, composition input box 304 may change in size and provide different functionality based on the amount of input received and on the size of the other data displayed by composer interface 300. For example, if the user provides an amount of input exceeding the default size of composition input box 304, the size of composition input box may increase and encroach on the space in which suggestions box 306 is typically presented. In another embodiment, a scroll bar may appear in composition input box 304 allowing a user to scroll through received input without affecting other content presented by composition input box 304. In addition, composition input box 304 may be reduced in size if less than a threshold amount of input is received or if interface generator 114 determines display of phrase objects improves user interaction with social networking system 110.

Suggestions box 306 displays phrase objects selected by social networking system 110 for selection by a user. As input is received, the phrase objects presented by suggestions box 306 are modified. Each portion of input provided by the user refines the phrase objects that a user may be inputting, allowing interface generator 114 to refine the phrase objects displayed in suggestions box 306. For example, in response to the user's typing "Eating ice," interface generator 114 displays suggested phrase objects, such as "ice cream," "chocolate ice cream," "vanilla ice cream," "delicious ice cream," "ice cream sundae," and "ice cream cake" based on completion of the "ice" portion of the input. However, if the user continues and types "Eating ice c," interface generator 114 may update suggestions box 306 to also display "ice cubes."

In an embodiment, the size of suggestions box 306 may dynamically change based on the number of phrase objects identified by interface generator 114. For example, suggestions box 306 may decrease in size to allow for presentation of a virtual keyboard when less than a threshold number of phrase objects are identified. As another example, if greater than a specified number of phrase objects are identified, suggestions box 306 may alter the font size with which phrase objects are displayed, display a scroll button 310 for navigating a scrollable list of phrase objects. Additional data, such as images, may be associated with phrase objects and displayed along with the displayed phrase objects. For example, associated images may be shown as icons proximate to their corresponding phrase object to allow users to quickly differentiate between different phrase objects. For example, the "chocolate ice cream" suggestion in FIG. 3 may be displayed along with a small icon of chocolate-flavored ice cream.

In some embodiments, such as example of FIG. 3, display space may be limited. To conserve space, less frequently-used features and selections may be reduced to smaller icons or removed from display. For example, an on-screen keyboard may be displayed when interface generator 114 identifies less than a minimum number of phrase objects for display. However, as additional input is received, interface generator 114 identifies an increased number of phrase objects for display, so a virtual keyboard is reduced to a keyboard button 308 to increase the display space available for displaying phrase objects. If a user does not find a phrase object associated with the received input, the user may retrieve the virtual keyboard by accessing keyboard button 308. Scroll button 310 may allow users to view additional phrase objects than those initially displayed by suggestions box 306 by updating the phrase objects displayed by suggestions box 306.

Phrase Object Identification and Extraction

Figure 4:
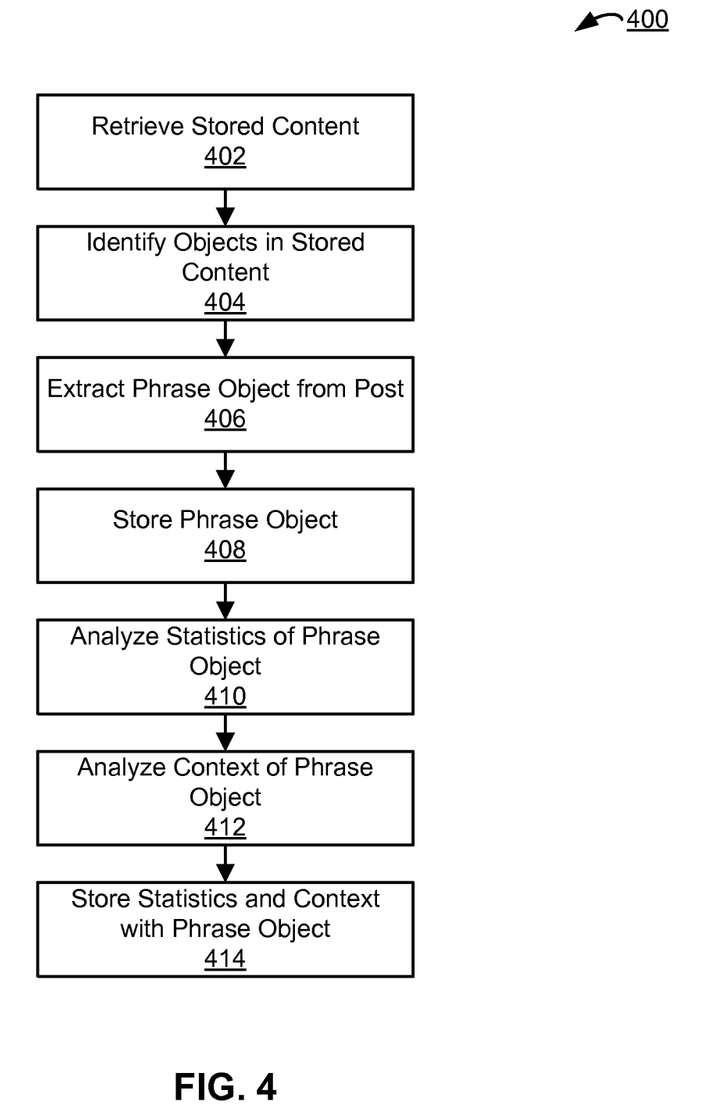
FIG. 4 is a flow chart of a method for identifying phrase objects from previously received content, in accordance with an embodiment.

FIG. 4 is a flow chart of one embodiment of a method 400 for identifying phrase objects from previously received content. Interface generator 114 analyzes previously received content stored by social networking system to identify phrase objects. Additionally, identified phrase objects are associated with the context surrounding the post from which the phrase object was identified. Associating phrase objects with context information allows interface generator to determine the relevance of a phrase object to content received from a user.

Interface generator 114 retrieves 402 content stored by social networking system, such as from content store 122, action log 118, or any other suitable source. In an embodiment, the content is retrieved 402 in response to receiving a command from a user. The commands may be explicit (e.g., user activates the phrase object extraction operations) or implicit (e.g., user sets interface generator 114 to periodically update the store of phrase objects, user begins typing a new post, the existing phrase objects store is outdated). In an embodiment, the retrieved content is associated with a user providing input to social networking system 110. For example, the retrieved data are posts, comments, and notes written by the user. In another embodiment, the retrieved content may be associated with users of the social networking system in addition to the user providing input.

Interface generator 114 identifies 404 objects associated with or identified with various stored content. For example, interface generator 114 identifies 404 objects associated with various stored posts of content. As discussed above, objects may include textual data, visual data, or auditory data. Interface generator 114 may identify 404 specific objects as candidates for phrase objects based in part on one or more factors. Examples of factors include a list of key objects, text rules, grammatical rules, frequency of usage, word length, or other suitable factors. For example candidate objects that interface generator 114 may identify from a post by a user specifying "I am going to eat chocolate ice cream with Jim," are "eat," "chocolate," "ice cream," and "Jim." In an embodiment, "Jim" may be associated with a specific additional user to which the user is connected, so the identified object is the user "Jim" rather than the word "Jim." Non-textual objects, such as pictures or videos, may be identified as objects associated with the post. For example, the user may have posted a picture of the chocolate ice cream along with the preceding example sentence, so the picture may also be identified as an object.

After identifying the candidate objects in a post, interface generator 114 identifies additional objects within a specified distance or having a specified relationship to an identified object. These additional objects are associated with the candidate objects. The candidate object and one or more of the additional objects are grouped into a phrase object that is extracted 406 from the content. For example, a phrase object that is extracted 406 from a post. In an embodiment, various text rules or grammar rules are applied to content from which a candidate object is retrieved to identify a phrase object. For example, in the previously mentioned example "I am going to eat chocolate ice cream with Jim," the word "chocolate" may be used to form the phrase object "chocolate ice cream." Multiple phrase objects may be formed from a single candidate object. For example, the word "chocolate" is used to form the phrase objects "eat chocolate" and "eat chocolate ice cream." Pictures of chocolate ice cream associated with the post (e.g., a picture of a chocolate ice cream attached to the post) may be included in a phrase object including "chocolate." In some embodiments, text rules may identify "chocolate" as descriptor in the example sentence and identify "ice cream" as the candidate object, with possible phrase objects of "chocolate ice cream," "eat ice cream," "ice cream with Jim," etc.

The phrase objects extracted from the stored content are stored 408. Stored phrase objects may be indexed to expedite subsequent analysis and retrieval of phrase objects. Phrase objects may be indexed based on objects included in the phrase objects. For example, the phrase object "chocolate ice cream" may be indexed under "chocolate," "ice," "cream," or any combination thereof; when a word under which a phrase object is indexed is received, interface generator 114 may retrieve the stored phrase objects including at least one of the words.

In various embodiments, interface generator 114 orders phrase objects presented to a user. For example, presented phrase objects are ordered in part by their popularity or frequency of usage. Accordingly, interface generator 114 analyzes 410 statistics associated with stored phrase objects. For example, interface generator 114 determines the number of times a phrase object is extracted from content associated with a user, determines the number of times a phrase object appears on social networking system 110, determines a rate at which a phrase object is used in an interval of time, or any other suitable criteria. Other statistics may be determined, such as the probability that user will select a phrase object, a percentage of posts including a phrase object, a percentage or number of social networking system users including a phrase object, or other suitable statistics. For example, interface generator 114 may determine that a user frequently tends to use the phrase "chocolate ice cream". Thus, when the user begins to type "choco", the interface generator 114 may prioritize "chocolate ice cream" over other phrases, such as "chocolate cake", "chocolate bar", "chocolate candy", or "chocolate Easter eggs".

In addition to statistical information, interface generator 114 may also analyze 412 context information associated with stored phrase objects. Contextual information associated with a phrase object may include a location associated with content from which the phrase object was extracted, a time associated with content from which the phrase object was extracted, additional users associated with content from which the phrase object was extracted, other content received from a location associated with the content from which the phrase object was extracted, or other suitable information. Interface generator 114 may identify specific information or attributes from the context associated with a phrase object, such as associated users, temporal information, geographical location, metadata, type of content, received feedback, or other suitable information. Statistics and context information associated with phrase objects may be used to generate a predictive model associated with a user indicating the likelihood of the user selecting various phrase objects. For example, when interface generator 114 detects that the user is in an ice cream store, the interface generator 114 may prioritize "chocolate ice cream". However, the interface generator 114 may prioritize "chocolate bar" when Halloween is approaching or when the user is typing in a candy store.

The analyzed statistics and extracted context are stored 414 as metadata associated with the corresponding phrase object. Alternatively, the statistics and the context are stored 414 using an indexing system linking the statistics and content with the corresponding phrase object. As described above, when content is received from a user, interface generator 114 determines phrase objects for presentation by comparing the received input and context information associated with the received input with stored phrase objects and statistics and/or context associated with stored phrase objects.

Phrase Object Organization

Figure 5:
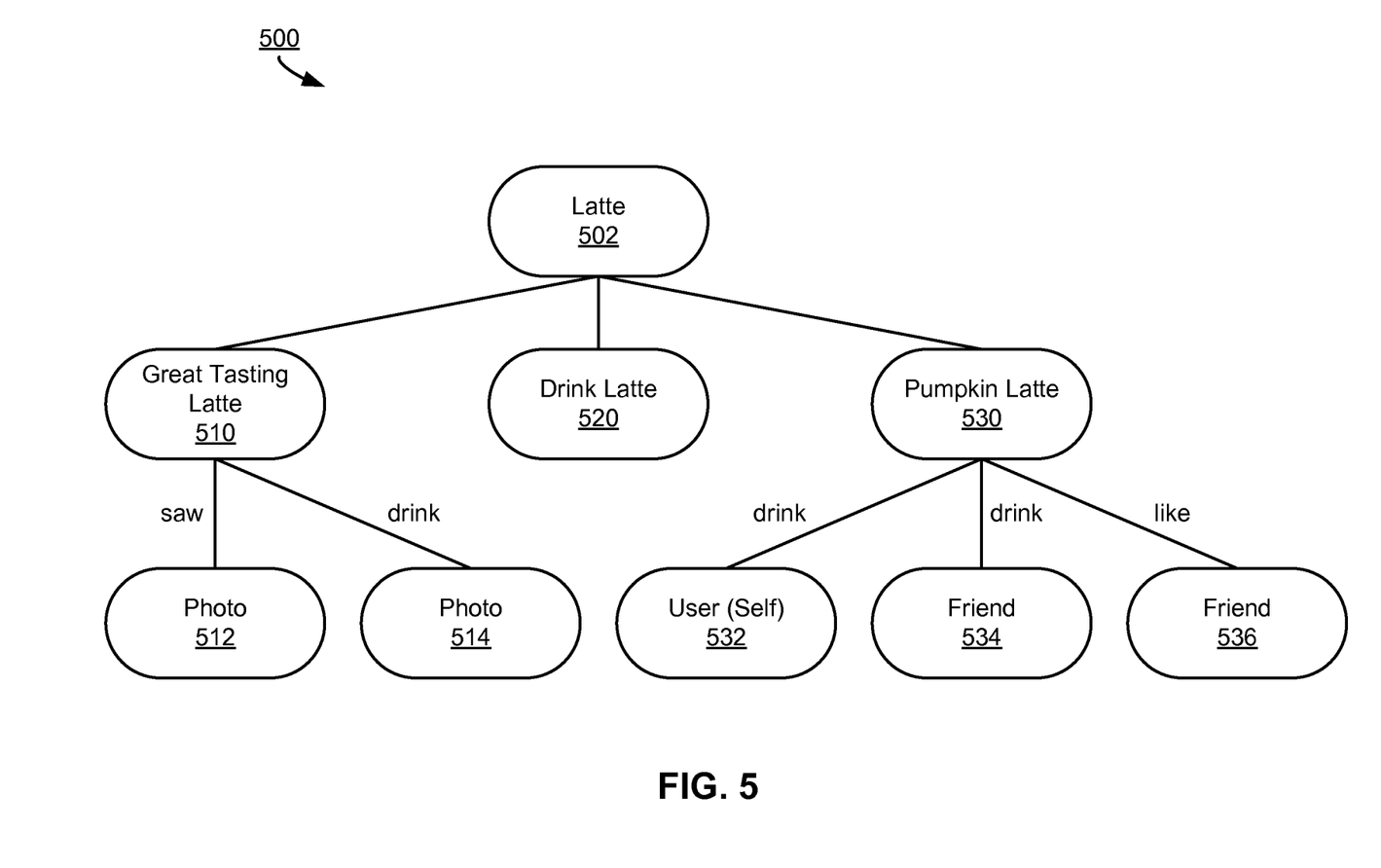
FIG. 5 is a visual representation of organization and association of phrase objects organization and associations by social networking system, in accordance with an embodiment.

FIG. 5 is a visual representation of one embodiment of organization and association of phrase objects by social networking system 110. Each node in node environment 500 represents an object or a phrase object. When objects and phrase objects are stored, connections or edges between the objects or phrase objects to indicate their relationships. Objects that are components of certain phrase objects may be connected to their respective phrase objects. In FIG. 5, "Latte" 502 is connected to three other nodes: "Great tasting Latte" 510, "Drink Latte" 520, and "Pumpkin Latte" 530. "Latte" 502 is a component of the three phrase objects, so the social networking system may designate it as a "hub" connected to each phrase object through offline phrase object extraction and determination. In an embodiment, a "hub" is a primary node to which sub-nodes are connected. For example, a hub is a word used to reference a category of phrase objects. For example, in FIG. 5, interface generator 114 may retrieve "Latte" 502 and its connected sub-nodes when "latte" is received via composer interface 300. By searching for "Latte" 502, interface generator 114 may quickly determine related phrase objects from which phrase objects presented to the user are selected. In an embodiment, phrase objects may be determined based on the social networking system 110 extracting many occurrences of the same phrase with the same hubs, which filters out the noise or uncommon phrases. If a user composes a novel phrase, such as "piping hot Latte", the social networking system 110 may not immediately designate it as a phrase object under the "Latte" hub but may store it for later analysis (e.g., future queries by other users, modification/deletion based on additional user feedback, repeated future uses and so forth). Based on the later analysis, the novel phrase may be retained in storage, deleted, or designated as a phrase object. Each node in node environment 500 may also be associated with metadata, such as statistical and/or contextual data. Thus, when interface generator 114 retrieves the category of phrase objects connected to "Latte" 502, metadata associated with the phrase objects may be analyzed to rank phrase objects for display. In some embodiments, the main indexing word and/or the associated phrase objects may include words from different languages. For example, "Latte" 502 may be connected to sub-nodes for the phrase objects "buona latte" or "schöne Latte," in addition to "good latte."

In some embodiments, phrase objects may be associated with social networking system users through sentiment analysis. When a user includes a phrase object in content shared via social networking system 110, interface generator 114 may establish an edge between the phrase object and the user, shown in FIG. 5 by the connections between user 532, friend 534, and friend 536 with "Pumpkin Latte" 530. Sentiment analysis determines key characteristics about the established edge through indicators, such as related descriptors (e.g., adjectives, verbs, modifiers and the like), key words (e.g., "like," "love," "hate," "dislike" and so forth), or user actions/feedback on the post (e.g., indicating a like, commenting positively or negatively, sharing the post and so forth). Interface generator 114 uses sentiment analysis to determine how the user feels about a phrase object, such as with positive emotions, negative emotions, various degrees of emotions and so forth. For example, user 532 and friend 534 both use the phrase object "Pumpkin Latte" 530 in posts. Through sentiment analysis of these posts, interface generator 114 determines that there are no key words or indications that these have a particular feeling towards the latte and connects these users to the "Pumpkin Latte" 530 node through a neutral term, such as "drink." However, sentiment analysis may indicate that friend 536 has a preference for pumpkin lattes, so interface generator connects friend 536 to the "Pumpkin Latte" 530 node via an edge having a "like" indicator.

In some embodiments, interface generator 114 does not associate an indicator with edges between nodes when no user sentiment is identified. Alternatively, interface generator 114 may associate a neutral indicator with a connection between nodes when no user sentiment is identified. Indicators may be associated with edges connecting phrase objects with non-user objects in some embodiments. For example, interface generator 114 uses sentiment analysis to determine sentiments for a phrase object based on the general usage of the phrase object on the social networking system 110. For example, at least a threshold number of users may comment about drinking lattes or indicate a preference for drinking lattes. Accordingly, interface generator 114 may associate a "like" indicator to an edge connecting phrase object "Drink Latte" 520 and "Latte" 502. Sentiment analysis results may be used when ranking phrase objects.

In an embodiment, phrase objects may be associated with related media content, such as images, videos, or audio. These media content may be objects represented by nodes connected to phrase objects by edges. For example, in FIG. 5, photo 512 and photo 514 are both connected to "Great Tasting latte" 510 by edges. Edges connecting media content to a phrase object may be labeled to indicate the relationship between the phrase object and the media content. Interface generator 114 may use labeling of edges to retrieve appropriate images or other content to present. Media content associated with phrase objects may be from publically available content or may be retrieved from a specified user. Restricted media content may be associated with a corresponding phrase object for presentation along with a phrase object to selected users, but not presented to other users. Hence, content presented along with phrase objects may be modified by privacy settings for different social networking system users.

In some embodiments, phrase objects may be media content. Hence, interface generator 114 may present phrase objects comprising media content. For example, when a user inputs "drink latte," interface generator 114 may determine that the user is likely referring to "Great Tasting Latte" 510 and present photo 514 as a phrase object. Likewise, interface generator 114 may present photo 512 if the user inputs "saw a latte." Media content may include a user's personal media content, media content publically available on social networking system 110, or a combination thereof. Personal media content may be retrieved if one or more keywords are received, such as "my." For example, if a user inputs "my bike," interface generator 114 retrieves and presents an image of the user's bicycle as a phrase object.

In some embodiments, advertisers or other third-parties may compensate social networking system 110 to present media content presented as a phrase object. For example, an advertiser provides social networking system 110 with compensation so that an image is included in the phrase objects presented to a user. For example, an advertiser may compensate social networking system 110 to display an image of a particular beverage brand as a phrase object when a user provides input for a post associated with soda, such as "drinking a soda."

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing a plurality of phrase objects previously posted to a social networking system by a plurality of users of the social networking system for display to one or more other users of the social networking system, the plurality of phrase objects each comprising one or more words and a context;
    storing a plurality of previously generated edges between the plurality of phrase objects and the plurality of users, each edge representing an action in the social networking system taken by one of the plurality of users in the social networking system on one of the plurality of phrase objects previously posted to the social networking system;
    receiving an input from a first user comprising a portion of content to be posted to the social networking system;
    retrieving context information associated with the first user;
    determining one or more candidate phrase objects from the plurality of phrase objects previously posted to the social networking system to present to the first user, each candidate phrase object including the user-input content and having a context matching the retrieved context associated with the first user;
    determining a likelihood of each candidate phrase object being selected by the first user for inclusion in the content to be posted to the social networking system;
    selecting one or more phrase objects from the candidate phrase objects based at least in part on the determined likelihoods;
    presenting the selected one or more phrase objects to the first user;
    receiving selection from the first user of a presented phrase object for inclusion in the content to be posted to the social networking system;
    posting the content including the first user-selected phrase object to the social networking system such that the content including the first user-selected phrase object is viewable by a second user of the social networking system;
    receiving an indication of a new action in the social networking system taken by the second user on the posted content including the first user-selected phrase object;
    generating a new edge representing the new action between the second user and the first user-selected phrase object posted to the social networking system;
    storing the new edge with the plurality of previously generated edges; and
    providing additional content from the social networking system to the second user based at least in part on the new edge.

2. The method of claim 1, wherein the context information includes one or more selected from a group consisting of: locations associated with the first user, times when input was received from the first user, additional users connected to the first user, actions previously performed by additional users connected to the first user, and any combination thereof.

3. The method of claim 1, wherein the likelihood of the first user selecting the candidate phrase object in the input is based in part on the frequency of usage of the candidate phrase object by users of the social networking system, a similarity between context associated with the candidate phrase object and the previously stored context corresponding to the candidate phrase object, a similarity between the candidate phrase object and the received input, and any combination thereof.

4. The method of claim 1, wherein one or more of the selected phrase objects are associated with images.

5. The method of claim 1, wherein providing additional content to the second user further comprises:
    determining the second user's sentiment towards the posted phrase object;
    generating an edge between the second user and the posted phrase object indicating the determined second user's sentiment; and
    providing additional content from the social networking system to the second user based on the generated edge having the indicator.

6. A method comprising:
    storing a plurality of phrase objects previously posted to a social networking system by a plurality of users of the social networking system for display to one or more other users of the social networking system, the plurality of phrase objects each comprising one or more words and a context;
    storing a plurality of previously generated edges between the plurality of phrase objects and the plurality of users, each edge representing an action in the social networking system taken by one of the plurality of users in the social networking system on one of the plurality of phrase objects previously posted to the social networking system;

determining context information associated with a first user in a social networking system, the context identifying one or more actions associated with the first user and one or more characteristics of the first user;

receiving an input from the first user comprising content to be posted to the social networking system for display a second user of the social networking system;

identifying, in the content to be posted, a candidate object of the plurality of phrase objects previously posted to the social networking system for display to the second user of the social networking system and stored by the social networking system, the first user different from the second user;

identifying one or more additional objects from the content to be posted including the candidate object;

generating one or more new phrase objects, a new phrase object including the candidate object and one or more of the additional objects within a threshold distance of the candidate object;

posting the content including the one or more new phrase objects to the social networking system such that the content including the one or more new phrase objects is viewable by the second user of the social networking system;

receiving an indication of a new action in the social networking system taken by the second user on the posted content including the one or more new phrase objects;

generating one or more new edges representing the new action in the social networking system between the second user and the one or more new phrase objects posted to the social networking system;

storing the one or more new edges with the plurality of previously generated edges;

providing additional content from the social networking system to the second user based at least in part on the one or more new edges.

7. The method of claim 6, wherein generating one or more new phrase objects is based at least in part on a list of objects.

8. The method of claim 6, further comprising:
generating statistical data associated with each of the one or more new phrase objects and the new edges, wherein the statistical data includes one or more selected from a group consisting of: a number of times a new phrase object is generated from content associated with the first user, a number of times the new phrase object is generated from content associated with additional users, a rate at which the new phrase object is used in an interval of time, and any combination thereof; and
storing the one or more new phrase objects, new edges, and associated statistical data.

9. The method of claim 6, wherein generating one or more new phrase objects comprises:
determining context information associated with the content to be posted including the candidate object and the one or more additional objects comprising a phrase object and associated with the first user;
storing the context information associated with the new phrase object.

10. The method of claim 9, wherein the context information associated with the content to be posted includes one or more selected from a group consisting of: a location associated with the content, a time associated with the content, one or more additional users associated with the content, one or more actions associated with the content, and any combination thereof.

11. The method of claim 6, further comprising:
determining the second user's sentiment towards the posted phrase object; and
generating an indicator for the new edge between the second user and the posted phrase object indicating the determined second user's sentiment.

12. The method of claim 6, wherein identifying additional objects within the threshold distance of the candidate object comprises:
applying one or more of text rules or grammatical rules to the candidate object and to the content previously posted by one or more users of the social networking system from which the candidate object was identified.

13. The method of claim 6, wherein generating one or more new phrase objects comprises:
determining statistical data associated with one or more of the new phrase objects; and
storing statistical data along with an associated new phrase object.

14. The method of claim 6, further comprising:
selecting one or more candidate phrase objects, the selected candidate phrase objects matching at least a portion of the received input and selected based on the stored context and a context associated with a candidate phrase object; and
selecting one or more phrase objects, from the one or more candidate phrase objects, having at least a threshold likelihood.

15. A method comprising:
storing a plurality of phrase objects previously posted to a social networking system by a plurality of users of the social networking system for display to one or more other users of the social networking system, the plurality of phrase objects each comprising one or more words and a context;

storing a plurality of previously generated edges between the plurality of phrase objects and the plurality of users, each edge representing an action in the social networking system taken by one of the plurality of users in the social networking system on one of the plurality of phrase objects previously posted to the social networking system;

via an interface for providing content to a social networking system, receiving input from a first user comprising a portion of content be posted to the social networking system;

retrieving a plurality of candidate phrase objects from the plurality of phrase objects previously posted to the social networking system associated with content previously stored by the social networking system, the plurality of phrase objects previously posted to the social networking system each comprising one or more words and a context;

determining a likelihood of each candidate phrase object being selected by the first user for inclusion in the content to be posted to the social networking system;

selecting one or more phrase objects from the candidate phrase objects based at least in part on the determined likelihoods;

presenting the selected one or more phrase objects to the first user;

receiving selection from the first user of a presented phrase object for inclusion in the content to be posted to the social networking system;

posting the content including the first user-selected phrase object to the social networking system such that the content including the first user-selected phrase object is viewable by a second user of the social networking system;

receiving an indication of a new action in the social networking system taken by the second user on the posted content including the first user-selected phrase object;

generating a new edge representing the new action between the second user and the first user-selected phrase object posted to the social networking system;

storing the new edge with the plurality of previously generated edges; and providing additional content from the social networking system to the second user based at least in part on the new edge.

16. The method of claim 15, wherein the likelihood of the first user including the candidate phrase object in the input is based in part on the frequency of usage of the candidate phrase object by users of the social networking system, a similarity between context associated with the candidate phrase object and the stored context, a similarity between the candidate phrase object and the received input, and any combination thereof.

17. The method of claim 15, further comprising:
selecting one or more candidate phrase objects from the plurality of phrase objects previously posted to the social networking system, the selected candidate phrase objects matching at least a portion of the received input and selected based on context associated with the received input and context associated with a candidate phrase object; and
selecting one or more phrase objects, from the one or more candidate phrase objects, having at least a threshold likelihood.

18. The method of claim 15, wherein one or more of the selected phrase objects are associated with images.

19. The method of claim 15, wherein context associated with the candidate phrase object comprises one or more selected from a group consisting of: a location associated with the candidate phrase object, a time associated with the candidate phrase object, one or more additional users associated with the candidate phrase object, one or more actions associated with the candidate phrase object, and any combination thereof.

20. The method of claim 15, wherein providing additional content to the second user further comprises:
determining the second user's sentiment towards the posted phrase object;
generating an indicator for the new edge between the second user and the posted phrase object indicating the determined second user's sentiment; and
providing additional content from the social networking system to the second user based on the generated edge having the indicator.

\* \* \* \* \*